US009523408B2

(12) United States Patent
Hoffmann

(10) Patent No.: US 9,523,408 B2
(45) Date of Patent: Dec. 20, 2016

(54) ROLLER FOR A PENDULUM MASS OF A CENTRIFUGAL FORCE PENDULUM

(71) Applicant: Schaeffler Technologies AG & Co. KG, Herzogenaurach (DE)

(72) Inventor: Jan Hoffmann, Rastatt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 53 days.

(21) Appl. No.: 14/414,885

(22) PCT Filed: Jul. 18, 2013

(86) PCT No.: PCT/DE2013/200065
§ 371 (c)(1),
(2) Date: Jan. 14, 2015

(87) PCT Pub. No.: WO2014/012547
PCT Pub. Date: Jan. 23, 2014

(65) Prior Publication Data
US 2015/0176675 A1    Jun. 25, 2015

(30) Foreign Application Priority Data

Jul. 18, 2012  (DE) .................. 10 2012 014 148
Dec. 20, 2012  (DE) .................. 10 2012 223 938

(51) Int. Cl.
*F16D 23/00* (2006.01)
*F16F 15/134* (2006.01)
(Continued)

(52) U.S. Cl.
CPC ......... *F16F 15/13484* (2013.01); *F16D 13/58* (2013.01); *F16F 15/12366* (2013.01); *F16D 2300/22* (2013.01)

(58) Field of Classification Search
CPC .. F16F 15/13484; F16D 13/58; F16D 2300/22
See application file for complete search history.

(56) References Cited

U.S. PATENT DOCUMENTS 8,746,425 B2 *  6/2014  Kawahara ......... F16F 15/12366
                                                192/213.1
8,857,586 B2 * 10/2014  Kawahara ............... F16H 45/02
                                                192/213.2

(Continued)

FOREIGN PATENT DOCUMENTS

DE    10 2011 087879    6/2012
EP        1 795 780     6/2007

*Primary Examiner* — David J Hlavka
(74) *Attorney, Agent, or Firm* — Davidson, Davidson & Kappel, LLC

(57) ABSTRACT

The vibration damper for damping vibrations for rotation around an axis of rotation, including a first component with at least one bow spring channel formed radially outside of a second component. A spring is formed in the bow spring channel, and fixed by a counter-component, wherein the first and second component and counter-component are made of sheet metal, characterized in that the second component and at least one of the following contact components: a) the first component and b) the counter-component have common contact areas, into which the second component and the at least one contact component run vertically to the rotation axis, and in which the edges thereof for centering lie one against the other, at least in some sections.

6 Claims, 5 Drawing Sheets

(51) Int. Cl.
*F16F 15/123* (2006.01)
*F16D 13/58* (2006.01)

(56) References Cited

U.S. PATENT DOCUMENTS

| | | | |
|---|---|---|---|
| 9,011,257 B2* | 4/2015 | Kawahara | F16F 15/12366 |
| | | | 464/68.8 |
| 2001/0052443 A1* | 12/2001 | Tomiyama | F16H 45/02 |
| | | | 192/3.29 |
| 2004/0185940 A1* | 9/2004 | Yamamoto | F16F 15/12366 |
| | | | 464/68.4 |
| 2007/0131506 A1 | 6/2007 | Wack et al. | |
| 2009/0151344 A1* | 6/2009 | Degler | F16F 15/12366 |
| | | | 60/338 |
| 2011/0201433 A1* | 8/2011 | Schnaedelbach | F16F 15/1232 |
| | | | 464/64.1 |
| 2013/0256088 A1* | 10/2013 | Tanaka | F16D 13/58 |
| | | | 192/203 |

* cited by examiner

ROLLER FOR A PENDULUM MASS OF A CENTRIFUGAL FORCE PENDULUM

The present invention relates to a vibration damper, to a friction clutch including a vibration damper, and to an associated motor vehicle.

BACKGROUND

Known torsional vibration dampers for motor vehicles, which may act, for example, simultaneously also as a clutch disk, are usually composed of multiple bow spring channels which are encompassed within a radially outer retainer and a radially inner drive plate. The retainer is usually manufactured as a separate component and must be mounted, centered and fixed during assembly of the vibration damper. The centering takes place via centering tabs, which have been integrally formed from the drive plate. The retainer is point-supported on the centering tabs. The fixing in the axial direction takes place via riveting, using shims, to a counter-plate of the retainer.

SUMMARY OF THE INVENTION

This construction is relatively delicate since the centering tabs do not absorb large forces in the radial direction, and therefore damage to the torsional vibration damper may occur, for example, as a result of wear-induced and gravity-induced sagging of the retainer.

The present invention provides a vibration damper for damping vibrations, in particular for damping torsional vibrations in a motor vehicle, for rotation about an axis of rotation, including a first component having at least one bow spring channel, which is formed radially outside of a second component, at least one spring being formed in the at least one bow spring channel, the spring being fixed in the bow spring channel by a counter-member, the first component and the second component and the counter-member being made of sheet metal, is characterized in that the second component and at least one of the following contact components: a) the first component and b) the counter-member have common contact areas, in which the second component and the at least one contact component run perpendicularly to the axis of rotation, and in which their edges abut each other, at least in some sections, for centering purposes.

The springs used are preferably spiral compression springs which store kinetic energy as a result of being compressed from a zero expansion position and may release the energy again by expanding into the zero expansion position. "The edges abutting each other" is understood to mean that in these areas the edges extend essentially in a common plane and are in flat or linear contact with one another. In particular, this is not understood to mean that the components in question overlap one another or that in one area centering tabs are formed at which a punctiform contact exists between the components.

Due to the bearing surface being considerably enlarged in comparison to known variants, greater forces in a radial direction may be absorbed, so that the vibration damper in question, which in particular is a torsional vibration damper, is more durable.

According to one advantageous embodiment, the first component and the counter-member are connected to one another by at least one at least form-fitting connection.

By forming an at least form-fitting connection, in particular in the form of one rivet or multiple rivets, the first component or retainer may be fixed in the direction of the axis of rotation. Preference is given to an embodiment in which the at least one form-fitting connection takes place radially outside of the edges of the second component and of the at least one contact component. This means that the centering function is separate from the fixing function of the form-fitting connection and thus, when using rivets, for example, it is not necessary to absorb any forces occurring in the radial direction. This takes place via the centering of the at least one contact component on the second component.

According to one advantageous embodiment, at least one bearing area is formed, in which the second component and at least one of the following components: a) the first component and b) the counter-member abut each other flat.

In contrast to the components resting flat one on top of the other in the contact areas, here the second component and at least one of the following components: a) the first component and b) the counter-member abut each other. This means that the components in question overlap one another in some areas in the direction of the axis of rotation. A fixing in the direction of the axis of rotation may thus be achieved, and associated forces in this direction may be absorbed.

According to one advantageous embodiment, in at least one first bearing area, preferably in multiple first bearing areas, the counter-member abuts against a first side of the second component in the direction of the axis of rotation and, in at least one second bearing area, preferably in multiple second bearing areas, the first component abuts against a second side of the second component situated opposite the first side.

As a result of such an embodiment, the first component and the counter-member may accommodate the second component virtually between them, so that a fixing in respect of movements in the direction of the axis of rotation may be achieved. The first and second bearing areas are preferably separate from one another in the circumferential direction and also do not overlap. Preferably, first and second bearing areas alternate in the circumferential direction.

According to a further aspect of the present invention, a friction clutch for detachably transmitting torque from an input shaft to at least one output shaft is provided, including at least one vibration damper according to the present invention.

In particular, the vibration damper may be integrated into another component or may be combined with another component, for example with the clutch disk or the like.

According to a further aspect, a motor vehicle having a drive unit including an output shaft, a drive train and a friction clutch for detachably connecting the output shaft to the drive train is provided. The friction clutch includes a vibration damper according to the present invention. Preferably, the drive unit is situated in the motor vehicle in front of a driver's compartment and transversely to a longitudinal axis of the motor vehicle.

Most motor vehicles nowadays have a front wheel drive and therefore the drive unit, for example, an internal combustion engine or an electric motor, is preferably situated in front of the driver's compartment and transversely to the main direction of travel. With such an arrangement, the installation space is particularly small and it is therefore particularly advantageous to use a clutch of small size.

The situation regarding the installation space is exacerbated in the "Small Car" category of cars according to the European classification. The assemblies used in a passenger car of the "Small Car" category are not significantly smaller than in passenger cars of larger car categories. However, the installation space available in small cars is much smaller.

The adjuster or friction clutch described above is particularly advantageous for small cars because the overall size is small and at the same time an extremely reliable adjustment is achieved. Passenger cars are assigned to a vehicle category according to, for example, size, price, weight and power, these definitions being subject to constant change according to the needs of the market. In the U.S. market, vehicles of the "Small Car" and "Very Small Car" categories according to the European classification correspond to the "Subcompact Car" class, and in the British market they correspond to the "Supermini" or "City Car" class. Examples of the "Very Small Car" category are a Volkswagen Fox or a Renault Twingo. Examples of the "Small Car" category are an Alfa Romeo Mito, Volkswagen Polo, Ford Fiesta or Renault Clio.

The features listed individually in the patent claims may be combined with one another in any arbitrary technologically useful manner and may be supplemented by explanatory circumstances from the description and details from the figures, whereby further embodiment variants of the present invention are shown.

BRIEF DESCRIPTION OF THE DRAWINGS

The present invention as well as the technical field will be explained in greater detail below on the basis of the figures. The figures show particularly preferred exemplary embodiments, to which, however, the present invention is not restricted. In particular, it should be pointed out that the figures and particularly the illustrated scales are purely schematic.

DETAILED DESCRIPTION

Figure 1:
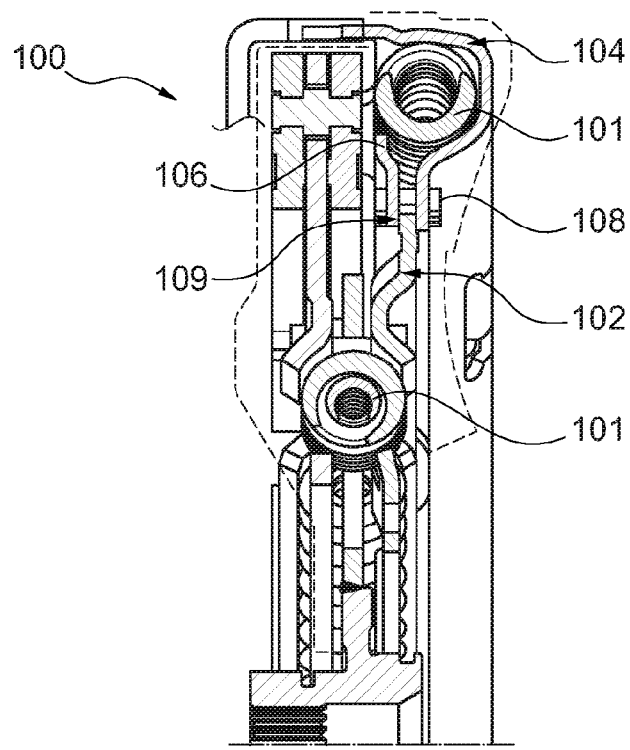
FIGS. 1 and 2 show a known vibration damper.
Figure 2:
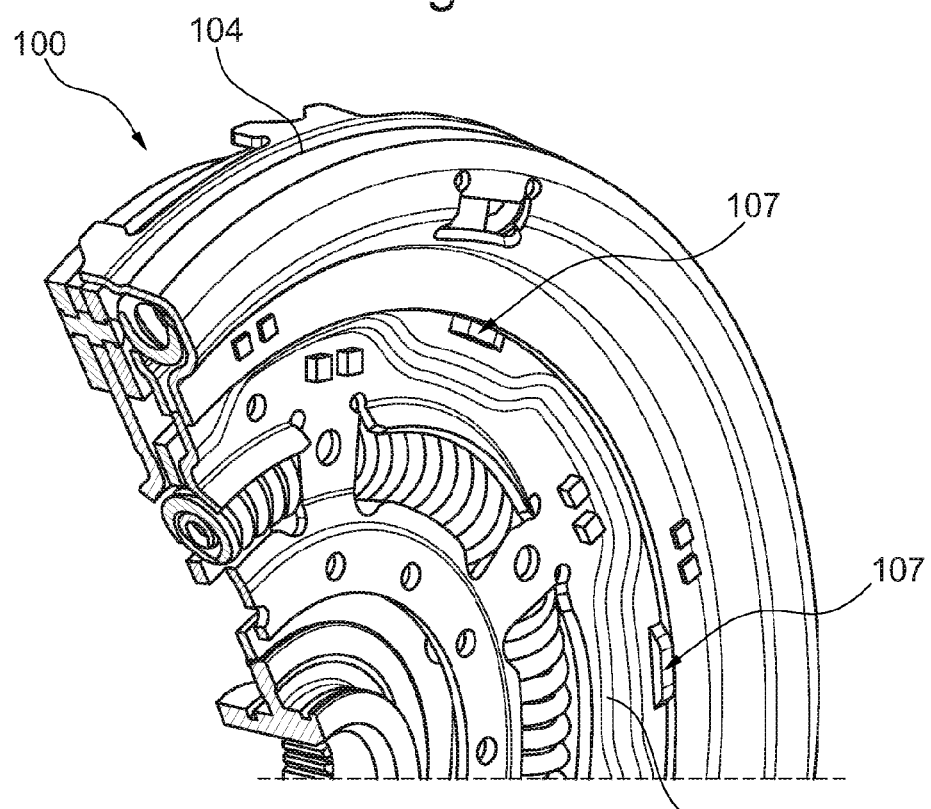

FIGS. 1 and 2 show a known vibration damper 100 in a partial section (FIG. 1) and in a perspective partial view (FIG. 2). Such a vibration damper 100 is used as a torsional vibration damper for damping torsional vibrations in the drives of motor vehicles, for example as part of a friction clutch, for example as a clutch disk. A torsional vibration damper serves for damping the torsional vibrations which occur during use, for example, of internal combustion engines as drive units in the motor vehicle due to the torque curve which, by principle, is irregular over short time scales. A homogenization of the torque curve may take place by storing the kinetic energy in the potential energy of springs 101 used in vibration damper 100, which takes place by twisting a drive plate 102 relative to a counter-plate 103.

Formed radially outside of drive plate 102 is a component 105 which forms a bow spring channel 104, in which respective spring 101 is held. Bow spring channel 104 is delimited at the rear by a fixing 106. Component 105 is centered on centering tabs 107. Centering tabs 107 permit an essentially punctiform support of component 105, so that they may absorb only limited forces in the radial direction. This may lead to damage to vibration damper 100.

Component 105 is connected to a counter-member 109 via rivets 108. Component 105 is punctiformly supported on drive plate 102 via rivets 108. These punctiform connections may also absorb only limited forces in the radial direction, so that damage to vibration damper 100 often cannot be avoided.

Figure 3:
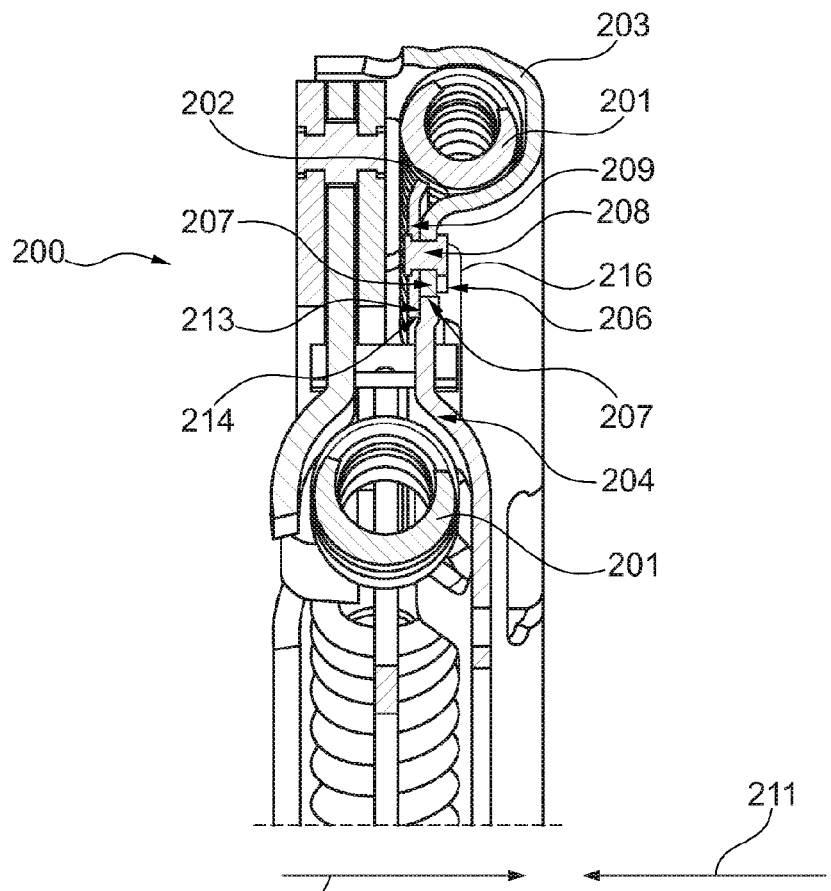
FIGS. 3 through 5 show a first example of a vibration damper.
Figure 4:
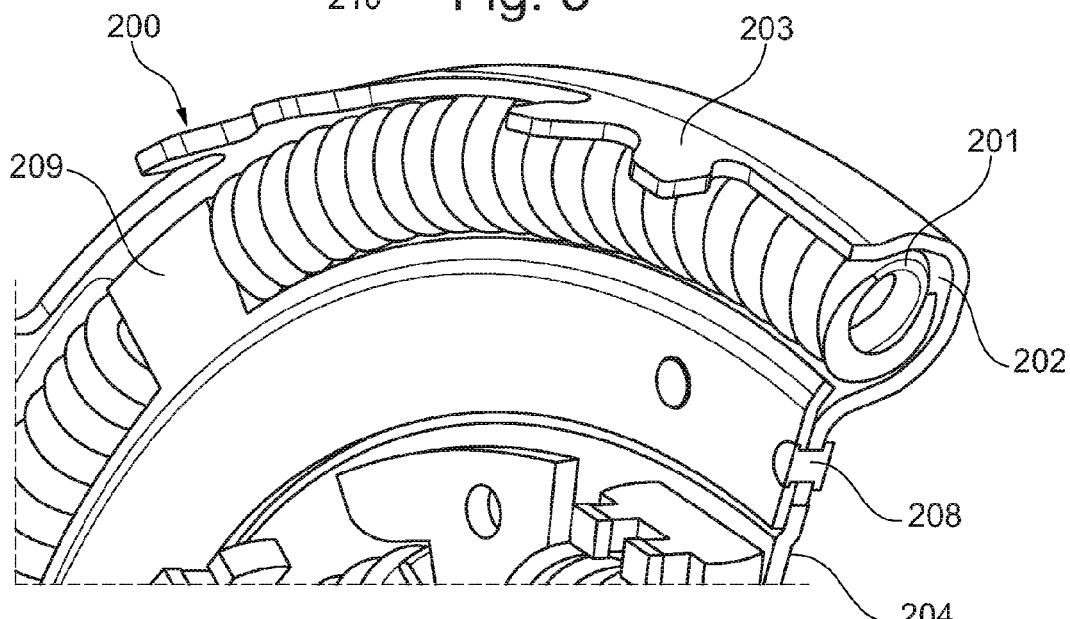
Figure 5:
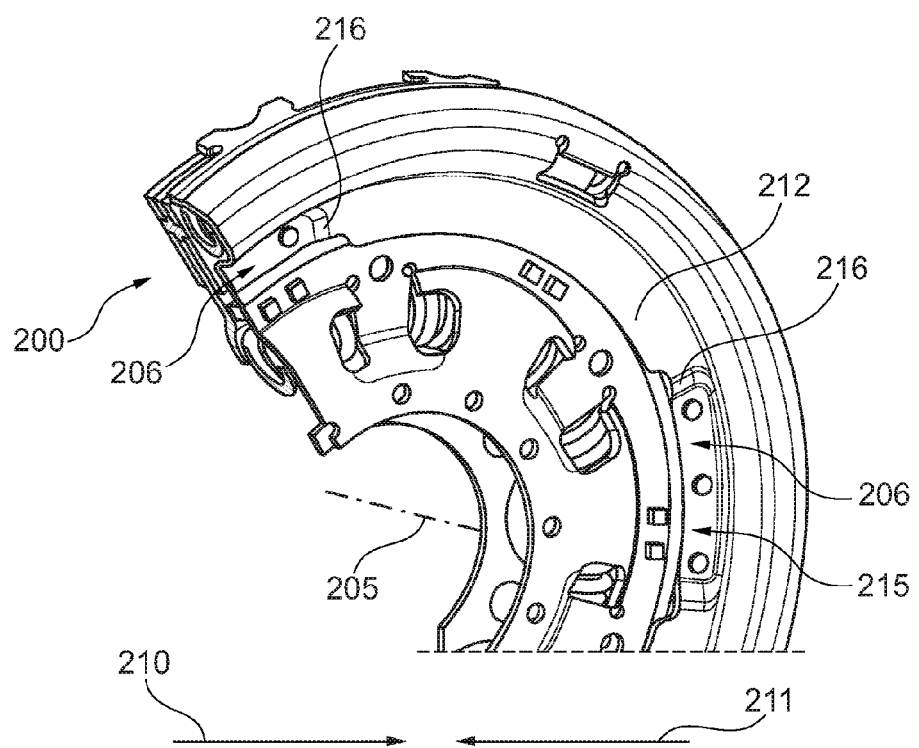

FIGS. 3 through 5 show a first example of a vibration damper 200 having springs 201 in corresponding bow spring channels 202, which is used as a torsional vibration damper for isolating vibrations in particular during transmission of torque from a drive unit of a motor vehicle to a drive train. The outer bow spring channels 202 are formed by a first component 203, which is also referred to as a retainer. First component 203 is situated radially outside of a second component 204, which is also referred to as a drive plate. During operation, vibration damper 200 rotates about an axis of rotation 205. The centering of first component 203 on second component 204 takes place in contact areas 206 in which first component 203 and second component 204 abut each other with their edges 207. In order to permit a centering here, first component 203 and second component 204 are configured in such a way that they run in contact areas 206 in a plane that runs perpendicularly to axis of rotation 205. First component 203 and second component 204 are configured in such a way that their edges 207 at least partially overlap in the direction of axis of rotation 205. In this example, therefore, first component 203 acts as the contact component, which is in contact with second component 204 in the area of their edges. During operation, fluctuations in the rotation frequency and thus torque fluctuations are damped in springs 201, in which kinetic energy is stored in the potential energy of the springs and then is released again. Preferably compression springs are used as springs 201.

First component 203 is fixed via rivets 208 which run in the direction of axis of rotation 205. Rivets 208 are in this case formed in contact area 206. Here, first component 203 is connected to a counter-member 209 via rivets 208. By virtue of counter-member 209, on the one hand a fixing of springs 201 in the associated bow spring channel 202 is achieved and on the other hand a fixing in a first direction 210 in the direction of axis of rotation 205 is achieved, since counter-member 209 overlaps in the radial direction with second component 204 in a first bearing area 213 and abuts against a first side 214 of second component 204 in the direction of axis of rotation 205. A fixing takes place in a second direction 211, opposite to the first direction 210, in a second bearing area 212 in which first component 203 abuts flat against a second side 215 of second component 204 situated opposite first side 214. In this second bearing area 212, first component 203 is configured in such a way that it lies in front of second component 204 in second direction 211 and thus second component 204 prevents any movement in second direction 211. In this example, first component 203 extends radially further inward in second bearing area 212 than in contact areas 206.

Both in contact area 206 and in second bearing area 212, first component 203 and second component 204 extend in a plane which in each case is directed perpendicularly to axis of rotation 205 but which are offset in relation to one another in the direction of axis of rotation 205, this being referred to as a depression 216 or as a setback in the direction of axis of rotation 205. Preference is given to an embodiment in which depression 216 may be implemented as an imprint.

By virtue of the centering via the edges of first component 203 and of second component 204, a much larger bearing surface is available for the centering than in the known approach, so that much greater forces in the radial direction may be absorbed, whereby furthermore rivets 208 are relieved of forces in the radial direction in comparison to known approaches. Bearing areas 212, 213, in which second component 204 abuts on a first side 214 against counter-member 209 and on opposite second side 215 against first component 203, provide an axial fixing of first component 203 relative to second component 204.

Figure 6:
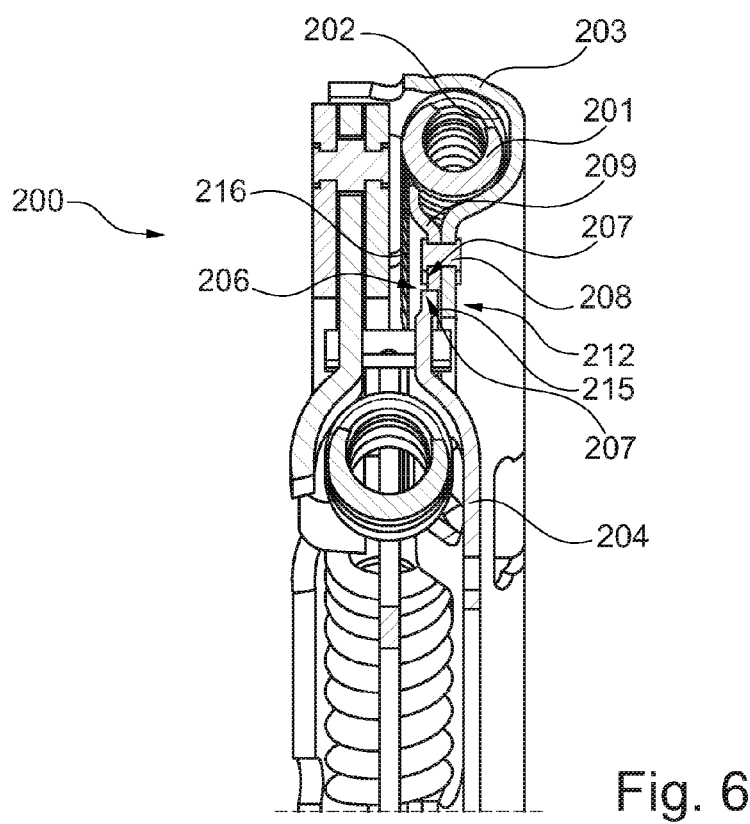
FIGS. 6 through 8 show a second example of a vibration damper.
Figure 7:
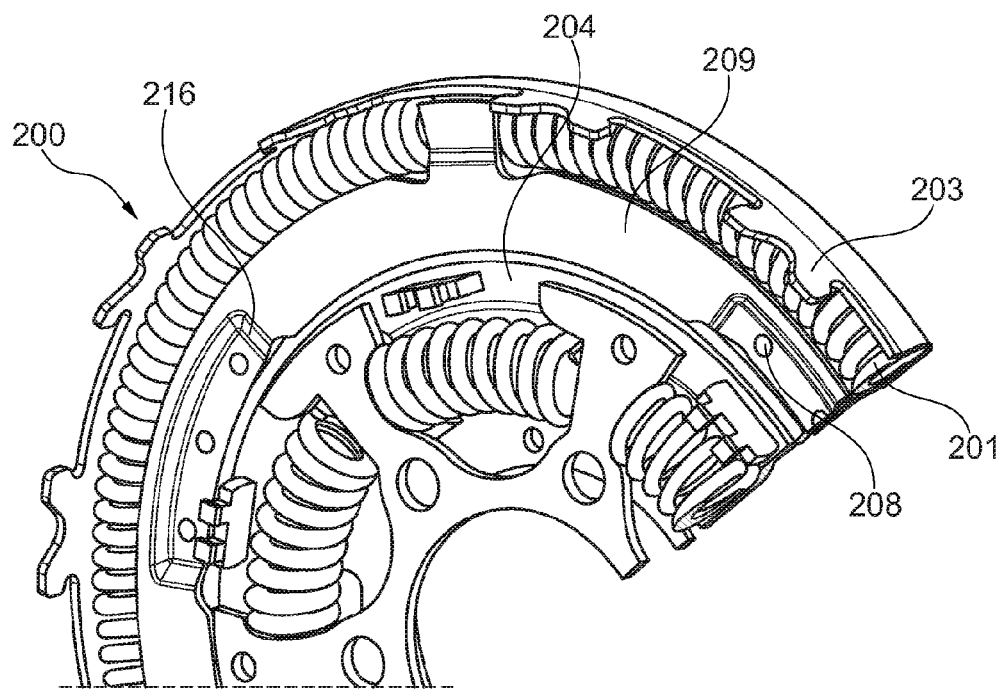
Figure 8:
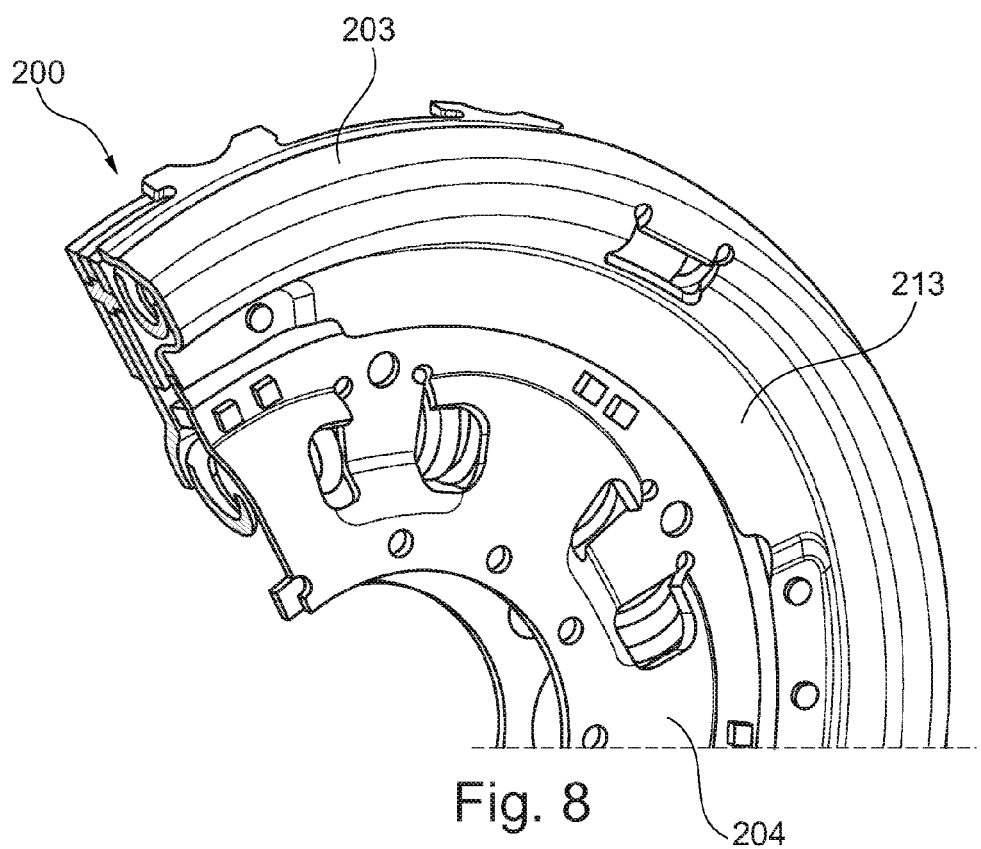

A second example of a vibration damper 200 is shown in FIGS. 6 through 8. Identical components are denoted by the same reference numerals as in the first example, reference being made to the statements in relation to this example. In this example, the centering takes place in contact areas 206, in which counter-member 209 and second component 204 abut each other with their edges in contact areas 206 for centering purposes. Here, counter-member 209 has depressions 216, as a result of which a setback is achieved between first bearing areas 213 and contact areas 206. First component 203 has no such depressions 216 and also no setback in the radial direction. Counter-member 209 thus acts as the contact component here.

The centering on counter-member 209 also enlarges the bearing surface in comparison to known vibration dampers 100, so that considerably greater forces in the radial direction may be absorbed.

Figure 9:
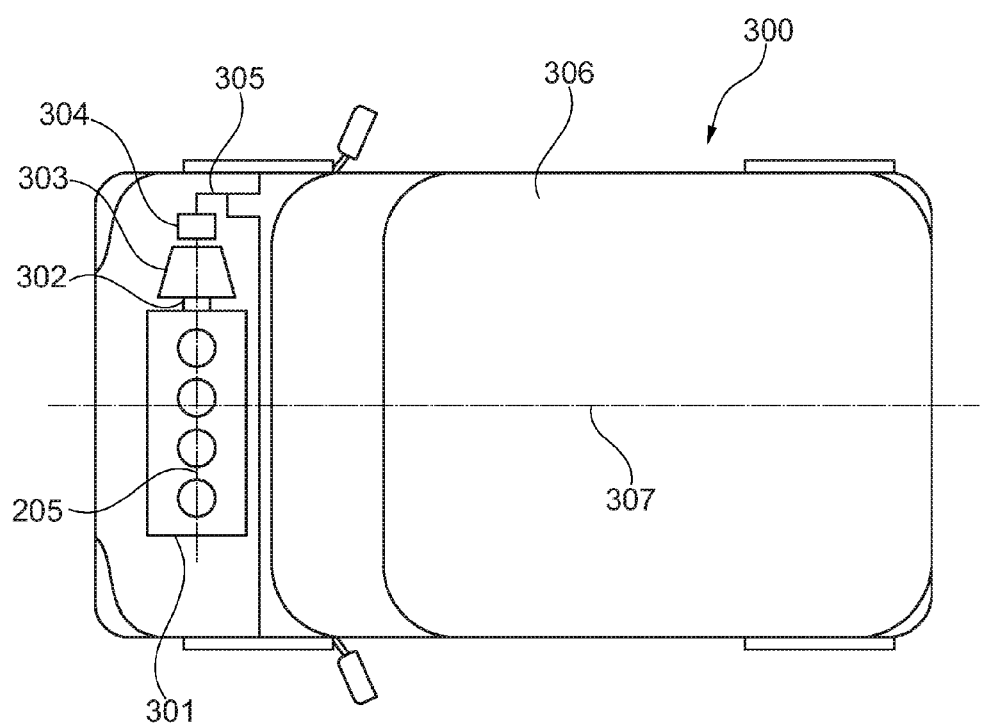
FIG. 9 shows an example of an associated motor vehicle.

FIG. 9 shows a motor vehicle 300 including a drive unit 301, in particular an internal combustion engine, which has an output shaft 302. Output shaft 302 is detachably connected to a drive shaft 304 of a drive train 305 of motor vehicle 300 via a friction clutch 303 having a vibration damper 200 (not shown in any greater detail). Drive unit 301 is formed in front of a driver's compartment 306. Output shaft 302 and drive shaft 304 rotate about axis of rotation 205, which is oriented transversely to a longitudinal axis 307 of motor vehicle 300.

A vibration damper 200 permits good vibration isolation with at the same time a simpler construction and greater stability particularly with regard to the absorption of forces in the radial direction, and improved durability as a result.

LIST OF REFERENCE NUMERALS 100 vibration damper
101 spring
102 drive plate
103 counter-plate
104 bow spring channel
105 component
106 fixing
107 centering tab
108 rivet
109 counter-member
200 vibration damper
201 spring
202 bow spring channel
203 first component
204 second component
205 axis of rotation
206 contact area
207 edge
208 rivet
209 counter-member
210 first direction
211 second direction
212 second bearing area
213 first bearing area
214 first side
215 second side
216 depression
300 motor vehicle
301 drive unit
302 output shaft
303 friction clutch
304 drive shaft
305 drive train
306 driver's compartment
307 longitudinal axis

What is claimed is:

1. A vibration damper for damping vibrations and for rotation about an axis of rotation, the vibration damper comprising:
a first component having at least one bow spring channel formed radially outside of a second component, at least one spring being formed in the at least one bow spring channel, the spring being fixed in the bow spring channel by a counter-member, the first component and the second component and the counter-member being made of sheet metal,
the second component and at least one contact component, wherein the at least one contact component is at least one of: a) the first component and b) the counter-member having common contact areas,
the second component and the at least one contact component running perpendicularly to the axis of rotation in common contact areas, and in the common contact areas, edges the second component and at least one contact component having edges that at least partially abut each other for centering purposes;
wherein at least one bearing area is formed, the second component and at least one of: a) the first component and b) the counter-member abutting each other flat in the at least one bearing area; and
wherein, in at least one first bearing area of the at least one bearing area, the counter-member abuts against a first side of the second component in the direction of the axis of rotation and, in at least one second bearing area of the at least one bearing area, the first component abuts against a second side of the second component situated opposite the first side.

2. The vibration damper as recited in claim 1 wherein the first component and the counter-member are connected to one another by at least one at least one form-fitting connection.

3. The vibration damper as recited in claim 1 wherein the vibration damper is a motor vehicle torsional vibration damper.

4. A friction clutch for detachably transmitting torque from an input shaft to an output shaft, comprising the vibration damper as recited in claim 1.

5. A motor vehicle comprising:
a drive unit including:
an output shaft;
a drive train; and
a friction clutch for detachably connecting the output shaft to the drive train, wherein the friction clutch includes the vibration damper as recited in claim 1.

6. The motor vehicle as recited in claim 5 wherein the drive unit is situated in the motor vehicle in front of a driver compartment and transversely to a longitudinal axis of the motor vehicle.

* * * * *